Figure 1:
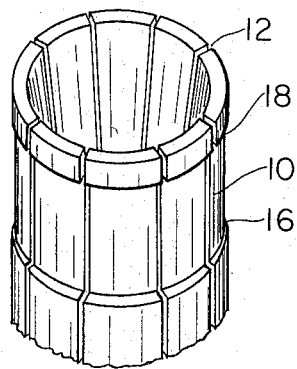

March 12, 1968  R. P. VINCENT ET AL  3,372,464
METHOD OF BONDING CARBIDE TO STEEL
Filed Oct. 22, 1965  2 Sheets-Sheet 1

RENIC P VINCENT
LAWRENCE B. WILDER
INVENTORS

BY John D. Gassett

ATTORNEY

RENIC P. VINCENT
LAWRENCE B. WILDER
INVENTORS

BY John D. Gassett

ATTORNEY

United States Patent Office 3,372,464
Patented Mar. 12, 1968

3,372,464
METHOD OF BONDING CARBIDE TO STEEL
Renic P. Vincent and Lawrence B. Wilder, Tulsa, Okla., assignors to Pan American Petroleum Corporation, Tulsa, Okla., a corporation of Delaware
Filed Oct. 22, 1965, Ser. No. 502,018
12 Claims. (Cl. 29—473.1)

This invention relates to fastening a hard metal onto a second metal. It relates especially to the fastening of a carbide ring on the outer surface of a hollow steel shaft by a brazing technique.

There are many grades of carbides such as tungsten carbide, titanium carbide, and tantalum carbide, which are very hard and highly resistant to wear. In fact only diamonds are harder than some grades of carbides. Because of this hardness and resistance to wear, carbides have been used widely, for example in cutting tools for machining metals, in bits for rock drilling, in valves and in other places where there is considerable wear between surfaces. Perhaps the most widely used carbide is tungsten carbide particles with a cobalt binder. It is known that the difficulty of fastening carbides to steel and other metals discourages many from adopting carbide as a cutting tool, wear part, or even as a component part. It is further known that if there is excessive breakage, it is usually the result of failure in the mounting of the carbide or the joint between the carbide and the steel and not breakage of the carbide itself.

There are four basic methods of fastening carbides to steel. These are mechanical attachment, cementing, brazing, and shrinking or pressing. This invention relates to a brazing technique and is an improved brazing method of fastening a carbide ring about a hollow shaft. It is thought that the main difficulty in brazing carbide to steel is that the thermal coefficient of expansion of steel is normally about 100% greater than that of carbide. This difficulty is especially pronounced in the case of fastening a carbide ring about the outer periphery of a steel tube.

This invention discloses a method for successfully fastening a carbide ring to a steel tube. In the practice of a preferred embodiment of this invention the steel tube is first specially prepared. Longitudinal slots are cut in the section of the tube which is intended to receive the carbide ring. These slots are slightly longer than the axial length of the carbide ring. A part of the wall of that portion of the tube which has been slit is removed by machining, or otherwise, to slightly reduce the outside diameter of the tube. This clearance is critically selected as to provide for maximum strength of the brazed joint. As will be discussed hereinafter, this optimum clearance, typically, can be about .0015 inch. This portion of reduced diameter of the steel tube is slightly less in axial or longitudinal length that the length of the carbide ring. Thus, each end of the carbide plug is in contact with the steel tube and encloses the clearance throughout the brazing operation. A proper brazing and flux material is placed in the clearance between the slotted portion of the steel shaft and the carbide ring.

Figure 2:
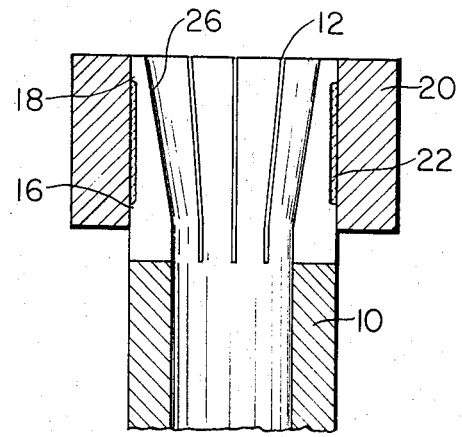
Figure 3:
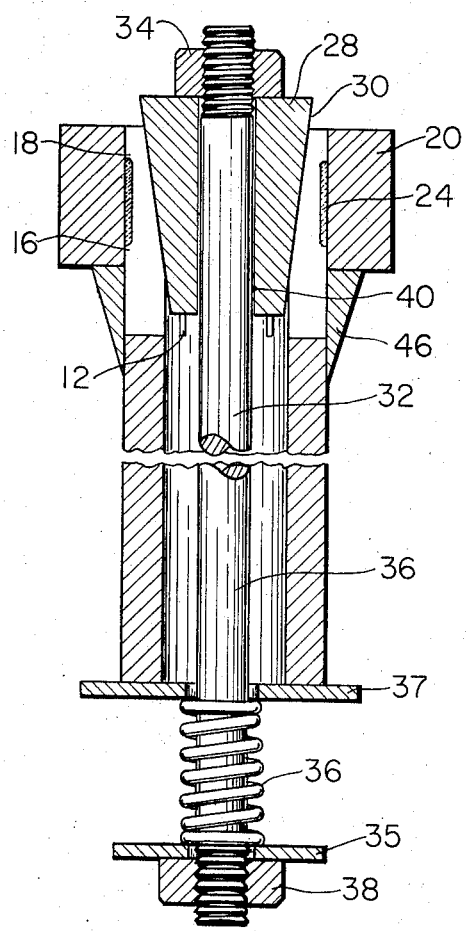
Figure 4:
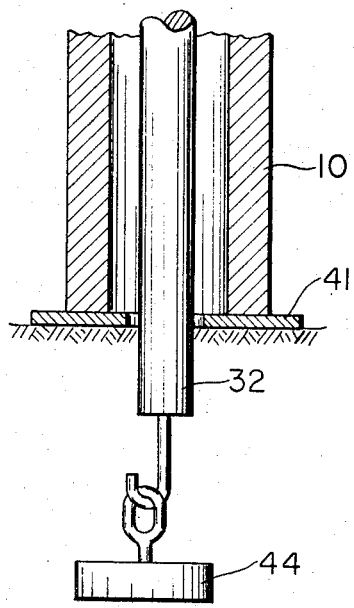
Figure 5:
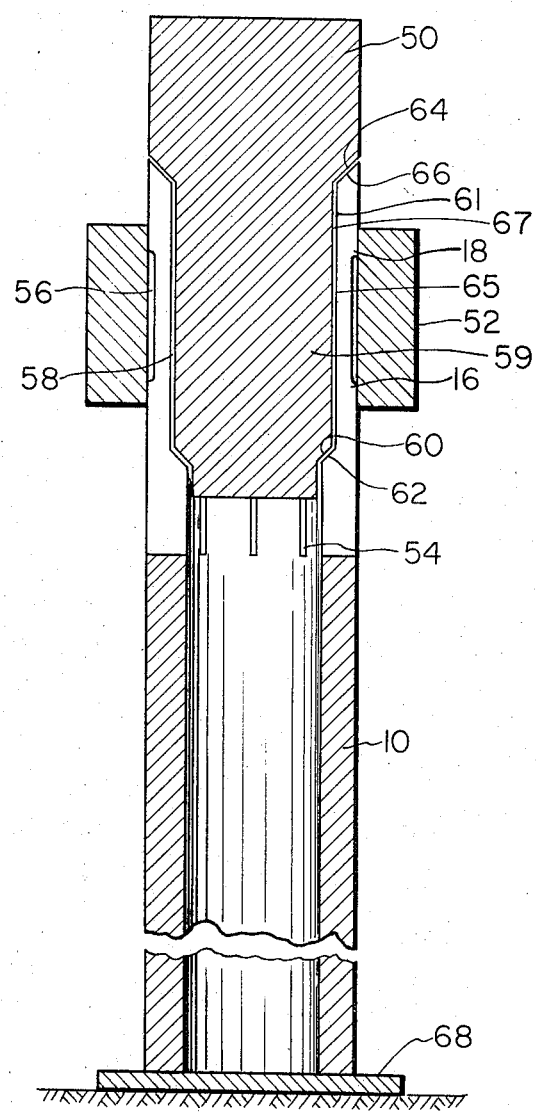

Before the flux is heated, in a preferred operation, a carbide plug is positioned within the steel tube adjacent the slotted portion. This carbide plug is made of the same carbide material as that of the carbide ring so that each will have the same thermal coefficient of expansion. Means are provided to hold the plug in position so as to properly force the plug against the interior of the steel shaft. The assembly is heated to the brazing temperature and then allowed to cool. The carbide plug can then be removed. Various other objects and a better understanding of the invention can be had from the following description taken in conjunction with the drawings in which:

FIGURE 1 illustrates a steel tube slotted at one end;
FIGURE 2 illustrates a carbide ring placed upon the slotted portion of the tube;
FIGURE 3 illustrates the assembly ready for heating;
FIGURE 4 illustrates another method of forcing an insert plug against the inner wall of the hollow shaft; and
FIGURE 5 illustrates an alternate configuration of a plug from that of FIGURE 2.

Shown in FIGURE 1 is a hollow steel shaft 10 which has been prepared in accordance with this invention for brazing a carbide ring to its outer periphery. This preparation includes the cutting of a plurality of longitudinal slots 12 in the wall of tube 10. The length of slots 12 is slightly greater than the longitudinal length of the carbide ring to be placed thereon. The extra length is provided to assure that the portion of the tube about which the carbide ring is placed has very little circumferential stresses upon heating and cooling. Typically, for tube 10 having a diameter of 1⅝", each slot would be about ¼" longer than the longitudinal length of the carbide ring. The number of such longitudinal slots is also important. The slots should be sufficiently close so that there is not too much circumferential stress set up in tube 10 by thermal expansion and contraction due to the heat required for brazing. Such stress should be less than the strength of the joint resulting from the brazing technique. Typically, the circumferential distance between slots should not be over about 1". It can also be said that the width of the slit of slot 12 should be considerably more than the clearance between the carbide ring and the steel stem, so that in the event the slit fills with brazing material during heating, the joint formed at the slit will be of much less strength than the joint between the carbide and the steel tube. By way of explanation, it has been found that there is an optimum thickness for maximum strength of the brazing joint. Typically this optimum thickness is about .0015 inch. Joints wider than .0015 inch are appreciably weaker than the optimum width joint. If the joint within the slit is of less strength than that of the joint between the tube and the carbide ring, upon contraction on cooling, the joint within the slit will fail. Then the slits are effective to reduce the stress on the joint between the carbide ring and steel shaft. Ideally, the slit should be wide enough to prevent the molten brazing material from filling the slits through capillary action and thus preventing the formation of a joint within the slit.

The outer diameter of tube 10 is reduced between points 16 and 18. The longitudinal length between points 16 and 18 is some small amount less than the length of the carbide ring which is to be fastened to the steel shaft. The length is less since the cylindrical surfaces extending beyond points 16 and 18 when expanded to contact the inner surface of the carbide ring 20 serves an essential function explained hereinafter. The diameter of the tube is reduced an amount which will provide the thickness of a joint which has maximum or near maximum tensile strength. It has been found that a braze joint about .003 inch thick gives a tensile strength of nearly 120,000 p.s.i. and a joint .0015 inch thick gives a strength of nearly 130,000 p.s.i. This was reported in an article "How to Fasten Carbide to Steel" by Grant A. Morrison, in Machine and Tool Blue Book, November 1961, page 127.

Attention is now directed to FIGURE 2 which shows a carbide ring 20 placed upon tubular shaft 10. It is noted that the ring is placed symmetrically in relation to the reduced diameter of shaft 10 between points 16 and 18. At this point it is well to note that this clearance 22 formed between ring 20 and shaft 10 could just as easily be formed by slightly increasing the inside diameter of the ring between points 18 and 16; alternatively, a portion of the clearance could be provided by machining away a part of both the ring and the shaft.

As can be seen in FIGURE 3 a brazing compound 24 such as silver solder is placed in clearance 22 and the ring 20 placed over the solder. If the finished shaft and carbide ring assembly is to receive light or medium duty a thin copper shim can be placed between two sheets of brazing material such as silver solder. Other braxing compounds of course can be used, however, it is found that silver solder is very good for using in joining a carbide ring such as tungsten carbide to a hard steel shaft.

The end of shaft 10 which has been slotted is machined to give an inside tapered surface 26. A hollow carbide plug 28 is provided having an outer surface 30 which complements the tapered surface 26 of shaft 10. This taper is a "sticking" taper, that is, expansion of the plug 28 against the interior wall of shaft 10, tends to resist axial movement between the plug and the shaft. Plug 30 is preferably made of the same material as carbide ring 20 so that they will have the same thermal coefficient of expansion.

Means are provided to hold plug surface 30 in firm contact with the interior surface 26 of tube 10. This includes a longitudinal rod or bolt 32 which extends through a bore 40 within plug 28 and the entire length of tube 10. A nut 34 on rod 32 is tightened against the base of plug 28. The other end of rod 32 is also provided with threads and a nut 38. A constant force spring 36 is placed about rod 32 and held in place between plates 35 and 37. Plate 37 is of a larger diameter than tube 10 for obvious reasons. Nut 38 is screwed onto bolt 32 below plate 35. Tightening of nut 38 on bolt 32 gives the selected compression to spring 36 so that plug 28 is held in place under a constant force.

Another way of maintaining plug 28 in a constant contact with tube 10 is shown in FIGURE 4. That figure differs from FIGURE 3 in that there is no spring assembly; it has been replaced by a weight 44 which is attached to the lower end of rod 32. The lower end of shaft 10 rests upon a fixed support 41. This is a preferred way of maintaining plug 28 in constant force against the wall of shaft 10 because the force is not sensitive to heat which might influence spring 36 in FIGURE 3. The need for a constant force is to cause the tapered plug to move downward as the outer carbide ring expands as it is heated to the brazing temperature. This downward movement assures that there will be an intimate contact between the hollow steel tube 10 and the carbide ring 20 at points 16 and 18 at brazing temperature; thus the critical joint width for the brazing material is maintained when joining two materials with widely different coefficients of thermal expansion. Once brazing temperature is reached the tapered carbide plug held firmly in place minimizes the differential movement between the two dissimilar materials as the assembly cools. Differential movement, if permitted, tends to destroy the joint before it is formed.

The greater the thickness of the wall of tube 10 the more difficult is the brazing job. As the steel has a thermal coefficient of expansion normally about twice that of the carbide, the steel wants to expand much more upon being heated and contract much more when being cooled. The greater the thickness of the tube the greater the total thermal expansion as the expansion is measured in inches per inch. To overcome this problem, it is important to provide a carbide wedge or plug to hold the tube against the carbide ring as the unit cools as explained above. For the embodiment of FIGURE 3 or 4, one should design the steel members as thin as possible and still be constant with the strength required of such steel member.

Insofar as the length between the slots is concerned and the length of the carbide ring, it has been found that as one tries to braze carbide and steel together where each has a dimension over 1" long (either with their length or width), the brazing is not normally very successful. Therefore care should be exercised to see that slots 12 are not over about 1" apart circumferentially and that the axial length of the carbide ring likewise is not over about 1".

To briefly summarize, the outer diameter of shaft 10 adjacent the slots in machined away for a length less than the length of the carbide ring. Then shaft 10 is slotted with slots 12. This clearance is carefully machined so as to provide a proper joint thickness. A brazing compound is placed in clearance 22 and carbide ring 20 is placed in position over the brazing compound. The surface of carbide plug 28 is coated with oil and graphite so that relative movement between surfaces 26 and 30 is easy at all times during the brazing operation. The carbide plug is then inserted in position and held there by a constant force to assure heavy contact between the steel tube and the ring 20. The assembly is then heated to brazing temperature such as 1200° F. for silver solder and then allowed to cool. The slotted portion of tube 10 at points or areas 16 and 18 is held firmly against the carbide ring 28 so that the brazed joint can set up. After the assembly is cooled down preferably to at least about 200° F., the carbide plug is removed. We then have a very strong joint between the carbide ring and the steel shaft.

It is sometimes desired to close the slots 12 which extend beyond the carbide ring 20. This is accomplished by having a steel ring 46 cover the slots such as shown in FIGURE 3. This ring can be welded or otherwise secured in position.

FIGURE 5 shows another embodiment for use in carrying out the brazing technique of the invention described herein. In this system the hollow steel tube 10 and carbide ring 52 are machined in essentially the same way as that described above in connection with FIGURES 1 through 4. This includes a clearance 56 between the carbide ring and that part of the cylinder in tube 10 between points 16 and 18. The tube also contains slots 54.

Plug 50 and the interior pipe 10 adjacent carbide ring 52 take on a different configuration from that of FIGURE 2. The plug is a stepped plug having three sections of different diameters. The lower section has a diameter less than the interior of tube 10. The diameter of intermediate section 59 is slightly less than the diameter of section 61 of pipe 10 which has been increased from the normal diameter of shaft 10. The diameter of the largest section of plug 50 is preferably about equal to or slightly larger than the diameter of shaft 10. From the smallest section of the plug to the intermediate section there is a sloping face 60 which has a non-sticking angle of about 45° with the horizontal plane. By non-sticking it is meant that there is very little friction between the two when moved axially with respect to each other. A similar sloping surface 64 is provided between the intermediate section and the larger section of the plug. The interior of shaft 10 is fabricated to have shoulders 62 and 66 mating with shoulders 60 and 64, respectively, of plug 50. These sloping surfaces are non-sticking. Clearance 58 between the intermediate section of stepped plug 50 and section 61 of shaft 10 is sufficiently large to prevent contact between interior surface 65 of section 61 and the external surface 67 of the intermediate section of the plug at the maximum anticipated differential expansion between shaft 10 and carbide ring 52. By using non-sticking surfaces on shoulders 60 and 62 and 64 and 66 and providing clearance 58 as described above, plug 50 does not have to be made of carbide material as was required in regard to FIGURES 1 to 4 when "sticking" angles were employed between the plug and the interior of the shaft 10.

In the operation of the device of the embodiment of

FIGURE 5, brazing material and a proper flux compound are put in clearance 58 between the carbide ring and the hollow steel tube. The heavy steel plug is then inserted in an upright position as shown so that the weight of the plug, or additional downward force, tends to keep it in the proper position. The entire device is then heated to the brazing temperature and then allowed to cool before the plug is removed. The force applied to the plug 50 is sufficient to keep area 16 and 18 in constant contact with the hollow steel tube 10 during heating and cooling operations. This is obtained by having a downward constant force acting on the plug (by its weight or external force) sufficient to result in a tensile hoop stress in the carbide ring of preferably between about 50 and 75% of the tensile strength of the carbide ring at brazing temperatures; such range has proved to be satisfactory. In this embodiment as the temperature of the assembly is raised, the steel parts of the assembly, that is the tube 10 and plug 50, expand more than the carbide ring; however, as there is a constant force applied to hold the plug 50 against the interior of the tube 10, the tensile stress of the carbide ring is not exceeded. Excessive tensile stresses of steel plug 50 which are ordinarily caused by expanding steel are relieved by the non-sticking tapered surfaces permitting the plug 50 to move axially with respect to the shaft 10. The stress caused by the expanding of the steel tube or shaft is relieved by the slots 54 similarly as described above in relation to FIGURES 1 through 4.

While only a limited number of embodiments of the invention have been described in the foregoing description, it is possible to produce still other embodiments without departing from the spirit or scope of the invention.

We claim:

1. A method of fastening a carbide ring having a longitudinal length L to a hollow steel shaft which comprises:
   (a) cutting longitudinal slots in the wall of said steel shaft, said slots extending longitudinally a distance in excess of L;
   (b) placing said carbide ring over the slotted portion of said shaft;
   (c) providing a clearance between said shaft and said carbide ring, said clearance being for a lesser length than the length of said carbide ring;
   (d) placing a brazing compound within said clearance;
   (e) placing a plug within said shaft adjacent said slotted portion, said plug having essentially the same thermal coefficient of expansion as said carbide-ring, and maintaining said plug in forceable contact with the interior wall of said steel shaft while heating the assembly to a brazing temperature, and during the subsequent cooling of the assembly after the brazed joint is made.

2. A method as defined in claim 1 wherein said clearance is obtained by reducing the diameter of the shaft in the range of from about .003 inch to about .004 inch.

3. A method as defined in claim 1 wherein said longitudinal slots extending beyond said carbide ring are covered by a ring of material with a coefficient of thermal expansion similar to the hollow steel shaft.

4. A method as defined in claim 1 in which said slots extend about ¼ inch beyond the length L.

5. A method as defined in claim 1 including the step of sealing that portion of the slots extending beyond the carbide ring.

6. A method as defined in claim 1 in which said brazing compound is silver solder, said carbide ring is tungsten carbide and said steel shaft has high strength.

7. A method as defined in claim 1 in which said plug is made of the same type carbide as the carbide ring.

8. A method as defined in claim 7 including the step of removing the carbide plug after the brazed joint has cooled to about 200° F.

9. A method as defined in claim 8 in which the slots in the wall of the steel shaft begin at one end thereof.

10. A method as defined in claim 1 in which the plug is maintained in contact by the gravity force of an external mass.

11. A method of fastening a carbide ring to a hollow steel shaft which comprises:
    (a) cutting longitudinal slots in the wall of said steel shaft, said slots extending longitudinally a distance in excess of the axial length of said carbide ring;
    (b) placing said carbide ring over the slotted portion of said shaft;
    (c) providing a clearance between said shaft and said carbide ring, said clearance being for a lesser length than the length of said carbide ring;
    (d) placing brazing material within said clearance;
    (e) placing a plug within said shaft adjacent said slotted portion;
    (f) forcing said plug against the interior wall of said steel shaft with a constant force, and
    (g) maintaining such constant force while heating the assembly to a brazing temperature and during the subsequent cooling of the assembly such that the carbide ring and steel shaft immediately adjacent said clearance is held in firm contact during the brazing operation.

12. A method as defined in claim 11 including increasing the inside diameter of said shaft adjacent said slots to form an enlarged diameter section; forming an internal shoulder between said enlarged diameter section and the unenlarged diameter section, such shoulder having a non-sticking taper; and preparing said plug to have a shoulder mating said internal shoulder of said steel shaft.

References Cited

UNITED STATES PATENTS

| | | |
|---|---|---|
| 2,617,850 | 11/1952 | Carmichael. |
| 2,817,144 | 12/1957 | Zeller _____ 29—501 X |
| 2,972,808 | 2/1961 | Litton _____ 29—473.1 |
| 3,131,470 | 5/1964 | Waller _____ 29—473.1 X |

OTHER REFERENCES

Bonding of Titanium Carbide to Steel, vol. 59, Issue 5, pp. 664–667, Metal Progress, May 1951.

JOHN F. CAMPBELL, *Primary Examiner.*

J. CLINE, *Assistant Examiner.*